(12) United States Patent
Bagepalli et al.

(10) Patent No.: US 8,171,674 B2
(45) Date of Patent: May 8, 2012

(54) DOORWAY FOR A WIND TURBINE TOWER

(75) Inventors: Bharat Bagepalli, Niskayuna, NY (US); Russell Earle Walthers, Saratoga, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/969,976

(22) Filed: Dec. 16, 2010

(65) Prior Publication Data

US 2011/0219711 A1 Sep. 15, 2011

(51) Int. Cl.
*E04H 12/00* (2006.01)
(52) U.S. Cl. .............. 52/40; 52/651.01; 52/835; 52/834
(58) Field of Classification Search ......... 52/40, 651.01, 52/651.02, 651.07, 834, 835, 843, 848, 854
See application file for complete search history.

(56) References Cited

U.S. PATENT DOCUMENTS

| 6,532,700 | B1 * | 3/2003 | Maliszewski et al. | 52/40 |
| 7,775,773 | B2 * | 8/2010 | Wernicke et al. | 416/244 R |
| 2008/0034675 | A1 * | 2/2008 | Kristensen | 52/40 |
| 2010/0313497 | A1 * | 12/2010 | Jensen | 52/173.1 |

FOREIGN PATENT DOCUMENTS

| EP | 1856410 | 6/2010 |
| WO | WO 2009/094991 | 8/2009 |
| WO | WO 2009/127608 | 10/2009 |

OTHER PUBLICATIONS

Photographs show an oval-shaped doorway formed within a tower segment of a wind turbine tower.

* cited by examiner

*Primary Examiner* — Jessica Laux
(74) *Attorney, Agent, or Firm* — Dority & Manning, P.A.

(57) ABSTRACT

A doorway for a tower of a wind turbine is disclosed. The doorway may generally comprise a doorway frame having a substantially rectangular shape and including an inner face and an outer face. An opening may be defined between the inner and outer faces and may be configured to provide access to an interior of the tower. Additionally, at least one of the inner face and the outer face may define a substantially planar surface along at least a portion of its width.

13 Claims, 4 Drawing Sheets

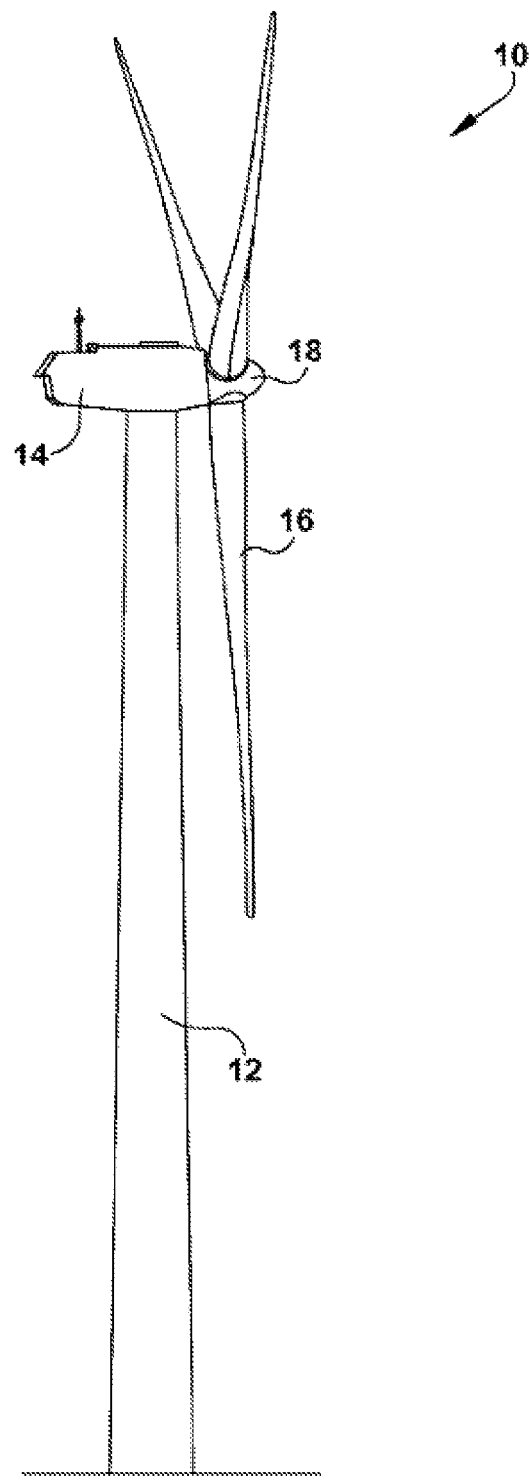
FIG. -1-

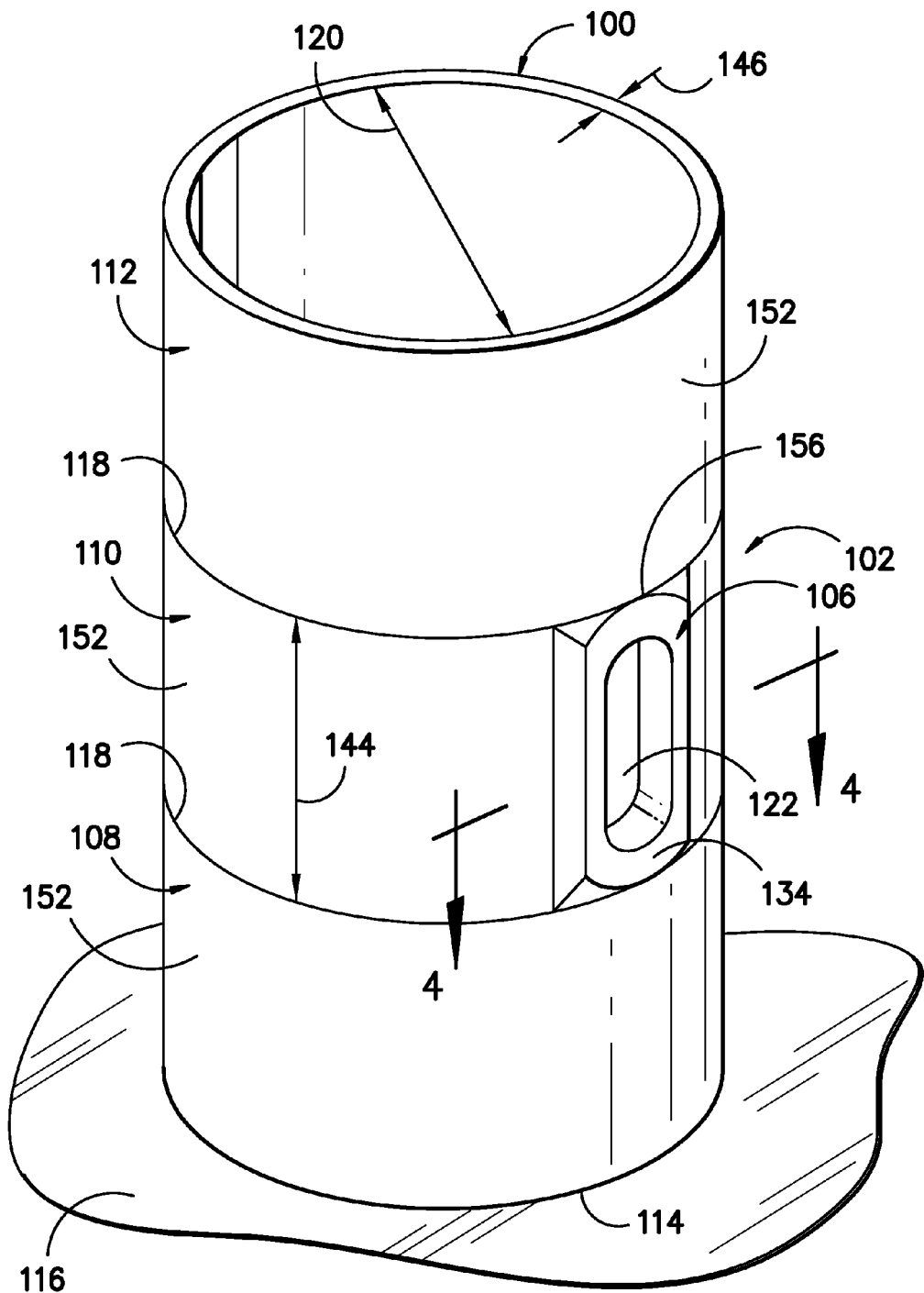
FIG. -2-

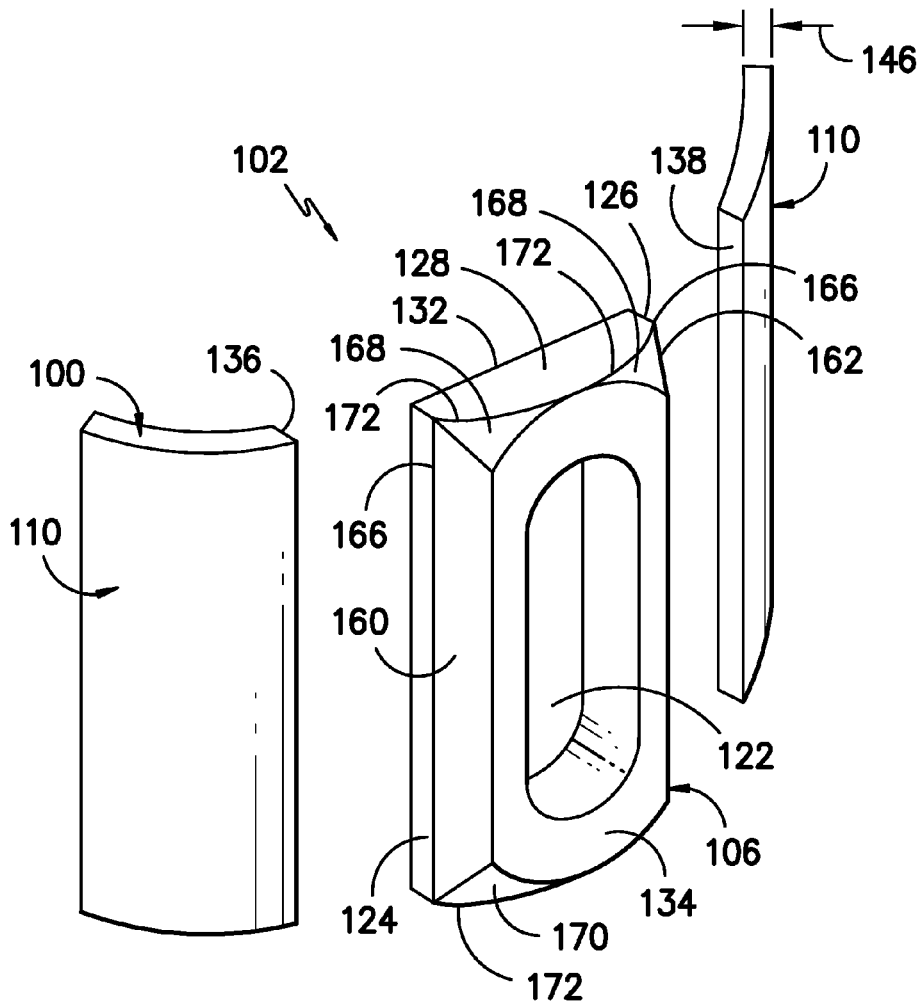
FIG. -3-
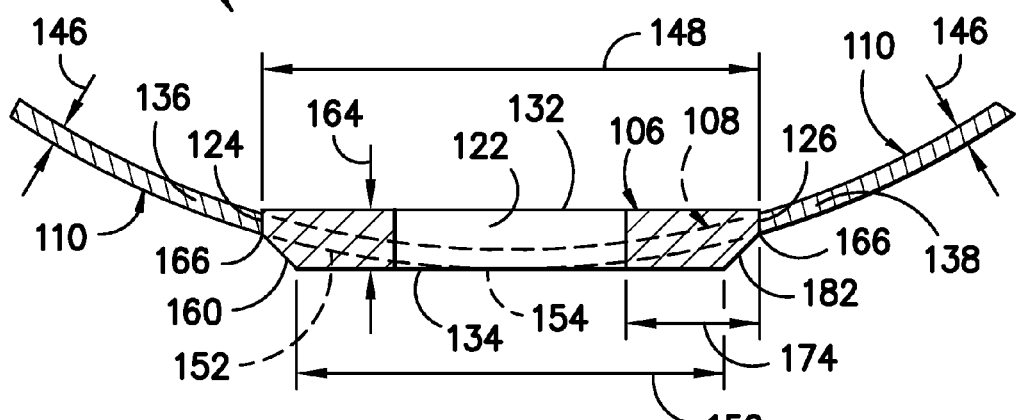
FIG. -4-

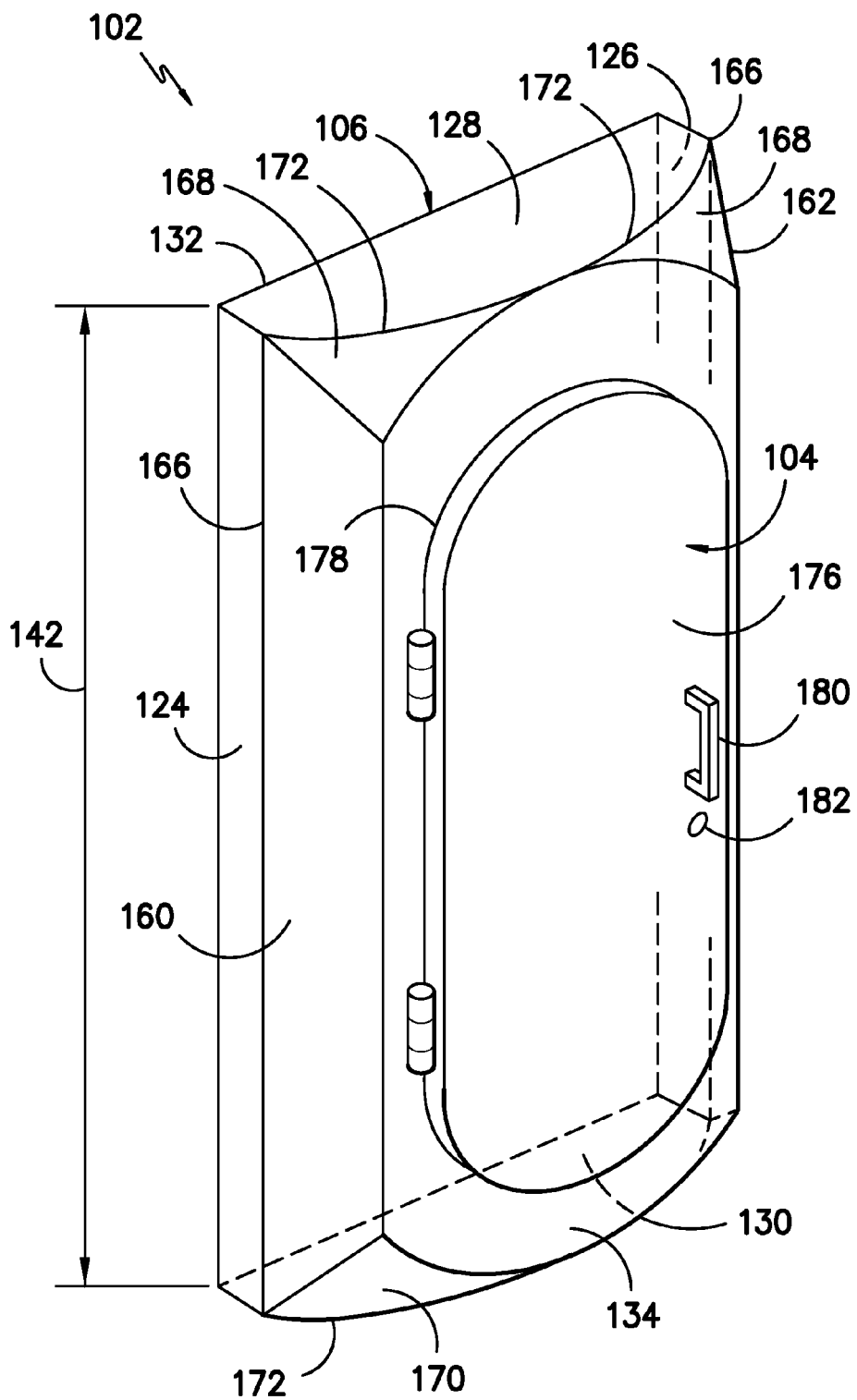
FIG. -5-

DOORWAY FOR A WIND TURBINE TOWER

FIELD OF THE INVENTION

The present subject matter relates generally to wind turbines and, more particularly, to a doorway for a wind turbine tower.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

The tower of a wind turbine is typically constructed from a plurality of tower cans or segments. Each tower segment generally comprises a steel plate that has been rolled and welded at the ends to form a circular shape. The circular shaped tower segments may then be stacked one on top of the other to form a hollow tower structure. Additionally, to provide access to the interior of the hollow tower structure, a doorway is typically formed in one or more of the tower segments.

Conventional wind turbine doorways are typically formed by cutting an oval-shaped aperture out of one or more of the tower segments and welding a corresponding oval-shaped doorway frame within the aperture. The doorway frame typically comprises a heavy, steel plate that has been rolled to match the curvature of the tower segments. Unfortunately, such a conventional doorway has several drawbacks. For example, to ensure that the doorway frame is properly installed within the tower, the aperture must be precisely cut out from the tower segment using a complex cutting process that is very time consuming and expensive. Additionally, the oval-shaped aperture generally defines an area of high stress concentration within the tower segments, thereby requiring the thickness of the tower segments to be increased in order to accommodate the additional stress. Moreover, the heavy, rolled doorway frames are typically difficult to manufacture and must be custom-made to match the particular curvature of the tower segments in which the doorway frame is being installed. Such curved doorway frames also require a correspondingly curved door, thereby further increasing the manufacturing time and expense necessary to form the tower doorway.

Accordingly, there is a need for a tower doorway that addresses many of the issues indentified in the prior art.

BRIEF DESCRIPTION OF THE INVENTION

Aspects and advantages of the invention will be set forth in part in the following description, or may be obvious from the description, or may be learned through practice of the invention.

In one aspect, the present subject matter discloses a doorway for a tower of a wind turbine. The doorway may generally comprise a doorway frame having a substantially rectangular shape and including an inner face and an outer face. An opening may be defined between the inner and outer faces and may be configured to provide access to an interior of the tower. Additionally, at least one of the inner face and the outer face may define a substantially planar surface along at least a portion of its width.

In another aspect, the present subject matter discloses a tower for a wind turbine. The tower may generally include a tower segment having first and second ends and a doorway disposed between the first and second ends. The doorway may generally comprise a doorway frame having a substantially rectangular shape and including an inner face and an outer face. An opening may be defined between the inner and outer faces and may be configured to provide access to an interior of the tower. Additionally, at least one of the inner face and the outer face may define a substantially planar surface along at least a portion of its width.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of a wind turbine of conventional construction;

FIG. 2 illustrates a partial perspective view of one embodiment of a wind turbine tower having a doorway installed therein in accordance with aspects of the present subject matter;

FIG. 3 illustrates a partial, exploded view of the wind turbine tower and the doorway shown in FIG. 2;

FIG. 4 illustrates a partial, cross-sectional view of the wind turbine tower and the doorway shown in FIG. 2; and, FIG. 5 illustrates a perspective view of the doorway shown in FIG. 3, particularly illustrating a door being installed on the doorway frame of the doorway.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring to the drawings, FIG. 1 illustrates perspective view of a wind turbine 10 of conventional construction. The wind turbine 10 includes a tower 12 with a nacelle 14 mounted thereon. A plurality of rotor blades 16 are mounted to a rotor hub 18, which is, in turn, connected to a main flange that turns a main rotor shaft. The wind turbine power generation and control components are housed within the nacelle 14. It should be appreciated that the wind turbine 10 of FIG. 1 is provided for illustrative purposes only to place the present invention in an exemplary field of use. Thus, one of ordinary skill in the art should understand that the invention is not limited to any particular type of wind turbine configuration.

Referring now to FIGS. 2-5, there are illustrated embodiments of a wind turbine tower 100 and a doorway 102 suitable for use with the tower 100 in accordance with aspects of the present subject matter. In particular, FIG. 2 illustrates a partial, perspective view of the tower 100 having the doorway 102 installed therein. FIG. 3 illustrates a partial, exploded view of the tower 100 and the doorway 102 shown in FIG. 2. FIG. 4 illustrates a partial, cross-sectional view of the tower 100 and the doorway 102 shown in FIG. 2. Additionally, FIG. 5 illustrates a perspective view of the doorway 102 shown in FIG. 3, particularly illustrating a door 104 installed on a doorway frame 106 of the doorway 102.

As particularly shown in FIG. 2, the disclosed wind turbine tower 100 may generally be constructed from a plurality of tower segments 108, 110, 112. In general, the tower segments 108, 110, 112 may be configured to be assembled one on top of the other so as to form a hollow structure extending from a base 114 of the wind turbine 10 to the nacelle 14 (FIG. 1) of the wind turbine 10. As is generally understood, the base 114 of the wind turbine 10 may generally be disposed on a suitable support surface 116, such as an artificial surface (e.g., a concrete pad) or a natural surface.

Additionally, each tower segment 108, 110, 112 may generally be attached to the other tower segments 108, 110, 112 disposed above and/or beneath it such that a circumferential seam 118 is defined between each of the tower segments 108, 110, 112. In general, the tower segments 108, 110, 112 may be configured to be attached to one another using any suitable attachment and/or fastening means known in the art. For example, in one embodiment, the tower segments 108, 110, 112 may be welded together to form the circumferential seams 118. Alternatively, the tower segments 108, 110, 112 may be secured or bonded together using suitable fasteners (e.g., screws, bolts, rivets, and the like) brackets, flanges, adhesives and the like in order to form the circumferential seams 118.

Further, it should be appreciated that the tower segments 108, 110, 112 may generally define any suitable shape that permits the segments 108, 110, 112 to be both stacked one on top of the other and also attached to one another. For instance, in several embodiments, each tower segment 108, 110, 112 may generally have a cylindrical shape defining a constant diameter 120. Alternatively, one or more of the tower segments may have a conical shape such that a decreasing diameter is defined in the tower segment(s) in the direction of the nacelle (14). Additionally, the tower segments 108, 110, 112 may generally be formed from any suitable material(s) and may be manufactured using any suitable process. For example, in several embodiments, the tower segments 108, 110, 112 may be formed from rolled steel plates having ends that are welded together so as to form a closed circular or conical shape.

Referring still to FIGS. 2-5, the tower 100 may also include a doorway 102 disposed proximate to the tower base 114. As shown, the doorway 102 may generally include a doorway frame 106 and a doorway opening 122 defined through the doorway frame 106 so as to provide access to the interior of the tower 100. In general, the doorway frame 106 may define a substantially rectangular shape and, thus, may include a first side surface 124 and a second side surface 126 extending substantially perpendicularly between top and bottom surfaces 128, 130 (FIG. 5). Additionally, the doorway frame 106 may include an inner face 132 (FIG. 4) oriented in the direction of the interior of the tower 100 and an outer face 134 oriented in the direction of the exterior of the tower 100. Accordingly, the doorway opening 122 may generally be defined between the inner and outer faces 132, 134 in order to provide a passageway from the exterior of the tower 100 to the interior of the tower 100 and vice versa.

The doorway frame 106 of the disclosed doorway 100 may generally be configured to be installed within one of the tower segments 110 of the tower 100 (hereinafter referred to as the doorway tower segment 110). In particular, the first and second side surfaces 124, 126 of the doorway frame 106 may generally be configured to be attached to first and second ends 136, 138 of the doorway tower segment 110. Thus, in several embodiments, the doorway tower segment 110 may be formed as a partially circular segment extending less than 360 degrees around. For example, in a particular embodiment, the doorway tower segment 110 may be formed from a steel plate have a shorter length than the steel plates used to form the adjacent tower segments 108, 112 (hereinafter referred to as the upper and lower tower segments 108, 112). Accordingly, when the doorway tower segment 110 is rolled to define a diameter equal to that of the diameters of the upper and lower tower segments 108, 112, the doorway tower segment 110 may include a gap between its first and second ends 136, 138 for accommodating the doorway frame 106. The doorway frame 106 may then be positioned between the ends 136, 138 of the doorway tower segment 110 to permit the tower segment 110 to be attached to the side surfaces 124, 126 of the doorway frame 106.

It should be appreciated that the ends 136, 138 of the doorway tower segment 110 may generally be attached to the first and second side surfaces 124, 126 using any suitable means. For example, in one embodiment, the ends 136, 138 may be welded to the side surfaces 124, 126. In other embodiments, the ends 136, 138 may be fastened or bonded to the side surfaces 124, 126 using suitable mechanical fasteners (e.g., bolts, screws, rivets and the like), brackets, flanges, adhesives and/or the like.

Additionally, in several embodiments, the doorway frame 106 may generally define a height 142 equal to the height 144 of the doorway tower segment 110. As such, the top and bottom surfaces 128, 130 of the doorway frame 106 may generally be configured to be disposed adjacent to the upper and lower tower segments 108, 112, respectively. For example, the top surface 128 may generally be aligned with the circumferential seam 118 defined between the upper tower segment 112 and the doorway tower segment 110. Similarly, the bottom surface 130 may generally be aligned with the circumferential seam 118 defined between the lower tower segment 108 and the doorway tower segment 110. It should be appreciated that, in such embodiments, the top and bottom surfaces 128, 130 may generally be attached to the upper and lower tower segments 108, 112 using any suitable means. For example, the top and bottom surfaces 128, 130 may be welded to the upper and lower tower segments 108, 112. Alternatively, the top and bottom surfaces 128, 130 may be fastened or bonded to the upper and lower tower segments 108, 112 using suitable mechanical fasteners (e.g., bolts, screws, rivets and the like), brackets, flanges, adhesives and/or the like.

It should also be appreciated that, by configuring the doorway frame 106 to have a substantially rectangular shape permitting it to be installed between the first and second ends 136, 138 of the doorway tower segment 110 and between the upper and lower tower segments 108, 112, the necessity of forming an oval-shaped cut-out in the doorway tower segment 110 is removed. As such, the area of high stress concentration typically formed by conventional doorways may be avoided. Accordingly, the thickness 146 of the doorway tower segment 110 may be significantly reduced, thereby decreasing the required material costs of the tower 100.

Referring still to FIGS. 2-5, in several embodiments of the present subject matter, at least one of the inner and outer faces 132, 134 of the doorway frame 106 may define a substantially flat profile. As used herein, the term "substantially flat profile" should be understood to mean that a planar surface is defined along at least a portion of the width 148, 150 of the inner face 132 and/or the outer face 134. Thus, as shown in the illustrated embodiment, the outer face 134 may generally define a flat, planar surface across its entire width 150. Similarly, the inner face 132 may define a flat, planar surface across its entire width 148. However, in other embodiments, the inner and outer faces 132, 134 may define planar surfaces across only a portion of their widths 148, 150.

By including inner and outer faces 132, 134 that define substantially flat profiles, it should be appreciated that the disclosed doorway frame 106 need not be rolled or otherwise formed so as to have a curved profile corresponding to the radius of curvature of the doorway tower segment 110. For example, in several embodiments, the doorway frame 106 may simply comprise a flat, rectangular plate formed any suitable material, such as steel, other metals, or any other suitable materials. In such embodiments, the flat plate forming the doorway frame 106 may then be machined (e.g., using any suitable cutting and/or grinding process) in order to define a suitable width and/or height that permits the frame 106 to be installed into between the ends 136, 138 of the doorway tower segment 110. As such, one of ordinary skill in the art should appreciate that a single doorway frame 106 manufactured in accordance with the present disclosure may be installed within numerous different tower segments 110 having a wide range of differing diameters 120 and/or thicknesses 146. Thus, the disclosed doorway frame 106 may serve as a common doorway design for a range of varying tower designs.

Additionally, in several embodiments, the outer face 134 of the doorway frame 106 may generally be configured to be radially aligned with at least a portion of the outer surface 152 of the upper tower segment 112 and/or the lower tower segment 108. In particular, the planar surface defined by the outer face 134 may be radially aligned with a tangent line defined along the curved profile of the outer surface 152 of the upper and/or lower tower segments 108, 112. For example, in the cross-sectional view of FIG. 4, the portion of the curved profile of the lower tower segment 108 over which the doorway frame 106 is mounted is depicted in hidden lines. As shown, the outer face 134 of the doorway frame 106 may generally be radially aligned with an outermost point 154 of the curved profile so that a tangential line defined through such point would generally be disposed in the plane defined by the outer face 134. Further, as shown in FIG. 2, the outer face 134 may similarly be radially aligned with the corresponding outermost point 156 of the upper tower segment 112. Accordingly, the doorway frame 106 may generally extend radially outwardly from the doorway tower segment 110 no further than such tower segment 110 would have extended had there been no doorway frame 106 installed therein. However, it should be appreciated that, in other embodiments, the outer face 134 need not be radially aligned with the upper and/or lower tower segments 108, 112. For instance, the outer face 134 may be positioned radially outwardly or radially inwardly from the outermost points 154, 156 of the upper and lower tower segments 108, 112.

Moreover, in several embodiments, one or more transition surfaces 160, 162, 168, 170 may be defined in the doorway frame 106 so as to blend the frame 106 with the doorway tower segment 110 and/or the upper and lower tower segments 108, 112. As such, a substantially smooth transition may be defined between the doorway frame 106 and one or more its surrounding tower segments 108, 110, 112. For example, in one embodiment, angled transition surfaces 160, 162 may be defined in the doorway frame 106 between the outer face 134 and the first and second side surfaces 124, 126 such that the thickness 164 of the doorway frame 106 is generally reduced or tapered in the direction of the side surfaces 124, 126. In particular, a first angled transition surface 160 may be defined between the outer face 134 and the first side surface 124 and a second angled surface 162 may be defined between the outer face 134 and the second side surface 126. The angled transition surfaces 160, 162 may generally be configured to extend radially inwardly from the outer face 134 so as to intersect the outer surface 152 of the doorway tower segment 110 at the first and second ends 136, 138. Thus, as particularly shown in FIG. 4, the corners 166 defined between the angled surfaces 160, 162 and the first and second side surfaces 124, 126 may generally be aligned with the outer surface 152 of the doorway tower segment 110 to provide a substantially smooth transition between the doorway frame 106 and the first and second ends 136, 138 of the doorway tower segment 110. In other embodiments, it should be appreciated that the transition surfaces 160, 162 defined between the outer face 134 and the side surfaces 124, 126 need not be angled. For instance, the transition surfaces 160, 162 may defined a generally curved profile.

Similarly, curved transition surfaces 168, 170 may be defined in the doorway frame 106 between the outer face 134 and the top and bottom surfaces 128, 130. In particular, upper curved transition surfaces 168 may be defined between the outer face 134 and the top surface 128 and lower curved surfaces 170 may be defined between the outer face 134 and the bottom surface 130. The curved transition surfaces 168, 170 may generally be configured to extend outwardly from the outer face 134 of the doorway frame 106 so as to blend with the portions of the curved profiles of the upper and lower tower segments 108, 112 extending adjacent to the top and bottom surfaces 128, 130. Thus, as particularly shown in FIG. 4, transition edges 172 may be defined between the curved transition surfaces 168, 170 and the top and bottom surfaces 128, 130 that generally correspond to the curved profiles of the upper and lower tower segments 108, 112 and provide a substantially smooth transition between the doorway frame 106 and the tower segments 108, 112.

It should be appreciated that the transition surfaces 160, 162, 168, 170 may generally be formed in the doorway frame 106 using any suitable means. For example, in embodiments in which the doorway frame 106 initially comprises a flat, rectangular plate, the edges of the doorway frame 106 defining the outer face 134 may be machined (e.g., using any suitable cutting and/or grinding process) to form the transition surfaces 160, 162, 168, 170 described above.

Additionally, referring particularly to FIG. 4, it should be appreciated that the required thickness 164 of the doorway frame 106 may generally vary depending on numerous factors including, but not limited to, the overall width 148 of the doorway frame 106, the border width 174 of the doorway frame 106 (i.e., the width 174 of the portion of the doorway frame 106 bordering the doorway opening 122), the thickness 146 of the doorway tower segment 110 and/or the diameter 120 of the doorway tower segment 110. Thus, in general, the doorway frame 106 may have any suitable thickness 164 that allows the frame to function as described herein. However, in a particular embodiment of the present subject matter, the thickness 164 of the doorway frame 106 may range from about 65 millimeters (mm) to about 85 mm, such as from about 70 mm to about 80 mm or from about 75 mm and about 85 mm and all other subranges therebetween. Similarly, the required border width 174 of the doorway frame 106 may generally vary depending on many of the factors described above and, thus, the doorway frame 106 may generally have any suitable border width 174 that allows the doorway frame 106 to function a described herein. However, in a particular embodiment of the present subject matter, the border width 174 may range from about 200 millimeters (mm) to about 300 mm, such as from about 200 mm to about 275 mm or from about 225 mm and about 300 mm and all other subranges therebetween.

It should also be appreciated that the dimensions of the doorway opening 122 defined through the outer and inner faces 132, 134 of the doorway frame 106 may generally vary depending on what must be transferred into and out of the tower 100. For example, in one embodiment, the dimensions of the doorway opening 122 may be configured such that a service worker may gain access to the interior of the tower 100. In other embodiments, the dimensions of the doorway opening 122 may be a function of the size of the equipment that must transported into and out of the tower 100. Further, it should be appreciated that the opening 122 may generally have any suitable shape. For instance, in several embodiments, the doorway opening 122 may be oval-shaped or may be generally rectangular with rounded corners.

Referring particularly now to FIG. 5, the disclosed doorway 102 may also include door 104 configured to be mounted to the doorway frame 106 so as to cover the doorway opening 122. In general, the door 104 may be configured similarly to any suitable wind turbine tower door known in the art. For example, the door 104 may include a handle 180 and a lock 182. Additionally, in several embodiments of the present subject matter, the door 104 may define a substantially flat profile. For example, the door 104 may include an outer face 176 and an inner face 178 defining a flat, planar surface. As such, the door 104 may provide for enhanced sealing and closure against the outer face 134 of the doorway frame 106. In particular, the planar surface of the inner face 178 of the door 104 may be aligned precisely against the planar surface of the outer face 134 of the doorway frame 106. Accordingly, the alignment issues inherent in matching the curvature of a door to the curvature of a conventional doorway frame may be avoided.

It should be appreciated that the door 104 may generally define any suitable shape. For example, in one embodiment, the door 104 may be oval-shaped. Alternatively, the door 104 may be substantially rectangular in shape. Additionally, it should be appreciated that the door 104 may generally be attached to the doorway frame 106 using any suitable means. However, in several embodiments, the door may be hingedly attached to the doorway frame 106 using suitable hinges or any other suitable pivotal attachment mechanism. As such, the door 104 may be quickly and easily moved from a closed position to an opened position and vice versa.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A tower for a wind turbine, the tower comprising:
a tower segment having a first end and a second end, the tower segment defining a curved shape between said first and second ends; and
a doorway disposed between said first and second ends, said doorway comprising:
a doorway frame having a substantially rectangular shape and including an inner face and an outer face; and,
an opening defined through said inner and outer faces, said opening configured to provide access to an interior of the tower,
wherein at least one of said inner face and said outer face defines a substantially planar surface along a substantial portion of its width.

2. The tower of claim 1, wherein said doorway frame has a height substantially equal to a height of said tower segment.

3. The tower of claim 1, wherein said doorway frame further includes a first side surface and a second side surface, said first and second side surfaces being attached to said first and second ends of said tower segment.

4. The tower of claim 3, wherein said first and second side surfaces are welded to said first and second ends of said tower segment.

5. The tower of claim 1, wherein said doorway frame further includes a first side surface and a second side surface, said doorway frame defining transition surfaces between said outer face and said first and second side surfaces such that a corner of said first and second side surfaces is substantially aligned with an outer surface of said tower segment.

6. The tower of claim 5, wherein said transition surfaces are angled radially inwardly from said outer face.

7. The tower of claim 1, wherein said inner and outer faces each define a planar surface across their entire width.

8. The tower of claim 1, further comprising an upper tower segment and a lower tower segment, said doorway frame further including a top surface disposed adjacent to said upper tower segment and a bottom surface disposed adjacent to said lower tower segment.

9. The tower of claim 8, wherein said top surface is attached to said upper tower segment and said bottom surface is attached to said lower tower segment.

10. The tower of claim 8, wherein said outer face is radially aligned with an outer surface of at least one of said upper tower segment and said lower tower segment.

11. The tower of claim 8, wherein said doorway frame defines curved transition surface between said outer face and said top and bottom surfaces, each of said curved transition surfaces defining a curved edge corresponding to at least a portion of a curved profile of at least one of said upper tower segment and said lower tower segment.

12. The tower of claim 1, further comprising a door attached to said doorway frame.

13. The tower of claim 12, wherein said door includes an inner face and an outer face, at least one of said inner face and said outer face of said door defining a substantially planar surface.

* * * * *